United States Patent
Imai

(10) Patent No.: US 7,411,017 B2
(45) Date of Patent: Aug. 12, 2008

(54) THERMOPLASTIC ELASTOMER AND MOLDED ARTICLE THEREOF

(75) Inventor: Tadashi Imai, Ichihara (JP)

(73) Assignee: Mitsui Chemicals, Inc., Tokyo (JP)

(*) Notice: Subject to any disclaimer, the term of this patent is extended or adjusted under 35 U.S.C. 154(b) by 346 days.

(21) Appl. No.: 10/522,750

(22) PCT Filed: Aug. 26, 2003

(86) PCT No.: PCT/JP03/10738

§ 371 (c)(1),
(2), (4) Date: Jan. 28, 2005

(87) PCT Pub. No.: WO2004/020217

PCT Pub. Date: Mar. 11, 2004

(65) Prior Publication Data

US 2005/0256273 A1    Nov. 17, 2005

(30) Foreign Application Priority Data

Aug. 27, 2002 (JP) ............................ 2002-246568

(51) Int. Cl.
*C08J 3/22* (2006.01)
(52) U.S. Cl. ...................... 524/525; 524/528
(58) Field of Classification Search ............ 524/528, 524/525

See application file for complete search history.

(56) References Cited

U.S. PATENT DOCUMENTS

| | | | |
|---|---|---|---|
| 4,565,851 A | 1/1986 | Barbee | |
| 4,729,927 A | 3/1988 | Hirose et al. | |
| 6,403,716 B1 | 6/2002 | Nishihara | |

FOREIGN PATENT DOCUMENTS

| | | |
|---|---|---|
| EP | 0 351 383 A2 | 1/1990 |
| EP | 0 351 391 A2 | 1/1990 |
| EP | 0 427 696 A2 | 5/1991 |
| EP | 0 427 697 A2 | 5/1991 |
| EP | 0 618 259 A2 | 10/1994 |
| EP | 0 670 350 A1 | 9/1995 |
| EP | 939094 A2 | 9/1999 |
| EP | 1 118 638 A1 | 7/2001 |
| EP | 1 195 404 A | 4/2002 |
| EP | 1 211 285 A1 | 6/2002 |
| JP | 59-215319 A | 12/1984 |
| JP | 2-41303 A | 2/1990 |
| JP | 2-41305 A | 2/1990 |
| JP | 3-179005 A | 8/1991 |
| JP | 3-179006 A | 8/1991 |
| JP | 4-69394 A | 3/1992 |
| JP | 6-287368 A | 10/1994 |
| JP | 7-21107 B2 | 3/1995 |
| JP | 07-138427 A | 5/1995 |
| JP | 7-247388 A | 9/1995 |
| JP | 2000-212348 A | 8/2000 |
| JP | 2000-355644 A | 12/2000 |
| JP | 2001-11247 A | 1/2001 |

*Primary Examiner*—Peter D Mulcahy
(74) *Attorney, Agent, or Firm*—Birch, Stewart, Kolasch & Birch, LLP

(57) ABSTRACT

A thermoplastic elastomer excellent in rubber elasticity and extrudability and a molded object thereof. The thermoplastic elastomer comprises a partly or wholly crosslinked rubber (A), an isotactic polypropylene (B) having an isotactic pentad content of 0.8 or higher, a syndiotactic polypropylene (C) having a syndiotactic pentad content of 0.6 or higher, and a softener (D), the content of the syndiotactic of the syndiotactic polypropylene (C) being in the range of 0.5 to 10 wt. % based on the sum of the crosslinked rubber (A), isotactic polypropylene (B), syndiotactic polypropylene (C), and softener (D), the thermoplastic elastomer having a melt flow rate of 0.01 to 1000 g/10 min as measured in accordance with ASTMD 1238 at 230° C. under a load of 10 kg. The molded object is obtained by extrusion-molding the elastomer.

15 Claims, No Drawings

THERMOPLASTIC ELASTOMER AND MOLDED ARTICLE THEREOF

FIELD OF THE INVENTION

The present invention relates to an olefin type thermoplastic elastomer and its molded article and to a thermoplastic elastomer suitable to products produced by extrusion molding and its molded product.

BACKGROUND OF THE INVENTION

Extrusion vulcanized molded articles comprising rubber compound products of ethylene/propylene/nonconjugated diene ternary copolymers (EPDM) have been generally used in parts for which low hardness and rubber elasticity are required in the applications such as automobile parts, electric/electronic parts and construction parts.

In the meantime, thermoplastic elastomers requiring no vulcanizing process have started to be used in place of vulcanized rubbers using ethylene/propylene/nonconjugated diene ternary polymers (EPDM) for seal materials in various uses from the viewpoint of productivity, environmental correspondence and light-weight.

As technologies concerning the compositions of thermoplastic elastomers, there are known technologies used to dynamically crosslink an ethylene/propylene (/nonconjugated diene) copolymer with a crystalline polyolefin. As the crystalline polyolefin, an isotactic polypropylene is used in consideration of, particularly, product property and moldability.

However, conventional thermoplastic elastomers are generally inferior to vulcanized rubbers in rubber elasticity represented by compression set as an index and therefore cannot be said to be satisfactory. When the amount of a crosslinking agent and the like is increased to improve the rubber elasticity, there is the problem that the degree of crosslinking is raised, which impairs the fluidity of a molded article, leading to deteriorated appearance. There is also the problem that die-residue adheres to a dice during extrusion molding, impairing the outward appearance and only insufficient extrusion moldability is obtained.

On the other hand, thermoplastic elastomers using a syndiotactic polypropylene as a crystalline polyolefin are described in, for example, each publication of JP-A Nos. 6-287368, 7-247388 and 2000-355644.

It is an object of the present invention to solve the problems involved in the above prior art technologies and to provide a thermoplastic elastomer having higher extrusion moldability than conventional thermoplastic elastomers, and a molded article of the thermoplastic elastomer.

DISCLOSURE OF THE INVENTION

The thermoplastic elastomer of the present invention comprises a rubber (A) which is partially or all crosslinked, an isotactic polypropylene (B) having an isotactic pentad ratio of 0.8 or more, a syndiotactic polypropylene (C) having an syndiotactic pentad ratio of 0.6 or more and a softener (D), wherein the syndiotactic polypropylene (C) is contained in an amount of 0.5 to 10% by weight based on the total amount (100% byweight) of the crosslinked rubber (A), isotacticpolypropylene (B), syndiotactic polypropylene (C) and softener (D), the elastomer having a melt flow rate of 0.01 to 1000 g/10 min., wherein the melt flow rate is measured at 230° C. under a load of 10 kg according to ASTM D1238.

Also, the molded article of the present invention is produced by molding the above thermoplastic elastomer of the present invention and is preferably an extrusion molded article.

Thermoplastic Elastomer

The thermoplastic elastomer of the present invention comprises a rubber (A) which is partially or all crosslinked, an isotactic polypropylene (B) having an isotactic pentad ratio of 0.8 or more, a syndiotactic polypropylene (C) having an syndiotactic pentad ratio of 0.6 or more and a softener (D), wherein the syndiotactic polypropylene (C) is contained in an amount of 0.5 to 10% by weight based on the total amount (100% by weight) of the crosslinked rubber (A), isotactic polypropylene (B), syndiotactic polypropylene (C) and softener (D), the thermoplastic elastomer having a melt flow rate of 0.01 to 1000 g/10 min., wherein the melt flow rate is measured at 230° C. under a load of 10 kg according to ASTM D1238.

The thermoplastic elastomer means those which have the same physical characteristics, such as softness and impact resilience, as a rubber and which can be processed as a thermo plastic in contrast with usual rubbers. The explanations like this are found in, for example, "Polymer Handbook" (Maruzen (K.K.), (1994))

The aforementioned thermoplastic elastomer of the present invention contains:

a rubber (A) which is partially or all crosslinked in an amount of preferably 5 to 94% by weight, more preferably 10 to 90% by weight and still more preferably 15 to 85% by weight;

an isotactic polypropylene (B) having an isotactic pentad ratio of 0.8 or more in amount of preferably 4.5 to 85% by weight, more preferably 7.5 to 80% by weight and still more preferably 10 to 75% by weight;

a syndiotactic polypropylene (C) having an syndiotactic pentad ratio of 0.6 or more in amount of preferably 0.5 to 10% by weight, more preferably 1 to 9% by weight and still more preferably 1.5 to 8.5% by weight; and a softener (D) in an amount of preferably 1 to 60% byweight and more preferably 5 to 50% by weight. (The total amount of (A), (B), (C) and (D) was defined as 100% by weight.)

Also, the ratio ((C)/(B)) by weight of the syndiotactic polypropylene (C) to the isotactic polypropylene (B) preferably exceeds 0 and is less than 1 and more preferably in a range from 0.05 to 0.7.

When the content of the rubber (A) which is partially or all crosslinked is in the above range, a thermoplastic elastomer having a proper softness (hardness) is obtained.

When the content of the isotactic polypropylene (B) is in the above range, a thermoplastic elastomer having a proper softness (hardness) and fluidity sufficient as a thermoplastic elastomer is obtained.

When the content of the syndiotactic polypropylene (C) is in the above range, a molded article scarcely adheres to a guide roll during extrusion molding and it therefore has good moldability. Also, die-residue is produced a little. Therefore, the content falling in the above range is preferable.

The thermoplastic elastomer of the present invention may be produced by the following method (1) or (2): a thermoplastic elastomer produced by the method (1) is preferable.

(1) A method to produce a thermoplastic elastomer in which a mixture containing a rubber component (A1), the isotactic polypropylene (B), the syndiotactic polypropylene (C) and the softener (D) is dynamically heat-treated in the presence of a crosslinking agent.

(2) A method to produce a thermoplastic elastomer in which a mixture containing a rubber component (A1), a polypropylene and the softener (D) is dynamically heat-treated in the presence of a crosslinking agent (E) and then a polypropylene is further added to the reaction mixture, which is then melt-kneaded. (Here, the polypropylene represents the isotactic polypropylene (B) and/or the syndiotactic polypropylene (C).) The isotactic polypropylene (B) may be added either before or after crosslinking. The syndiotactic polypropylene (C) may be added either before or after crosslinking though it is preferably added after crosslinking. More specifically, a method is exemplified in which a mixture containing the rubber component (A1), the isotactic polypropylene (B) and the softener (D) is dynamically heat-treated in the presence of a crosslinking agent (E) and then, the syndiotactic polypropylene (C) is further added to the reaction mixture, which is then melt-kneaded to produce a thermoplastic elastomer.

Here, the term "dynamically heat-treated" means that the mixture is kneaded in a molten state (the same as follows). The dynamic heat treatment in the present invention is preferably carried out in a non-open type apparatus and also under an inert gas atmosphere such as nitrogen or carbon dioxide gas atmosphere.

The kneading temperature is generally 150 to 280° C. and preferably 170 to 240° C. The kneading time is generally 1 to 20 minutes and preferably 3 to 10 minutes. Also, the shear force to be applied is generally 10 to 100,000 $\sec^{-1}$ and preferably 100 to 50,000 $\sec^{-1}$ in terms of shear rate.

As the kneading machine, a mixing roll, intensive mixer (for example, a Banbury mixer and kneader) and single axis or double axis kneader may be used. The kneading machine is preferably a non-open type apparatus.

According to the present invention, a thermoplastic elastomer put in the state that apart or all of the rubber component is crosslinked by the above dynamic heat treatment is obtained.

The melt flow rate (MFR; ASTM D 1238, 230° C., load: 10 kg) of the thermoplastic elastomer obtained in the above manner according to the present invention is usually 0.01 to 1000 g/10 min., preferably 0.05 to 100 g/10 min. and more preferably 0.1 to 70 g/10 min. A thermoplastic elastomer having a melt flow rate falling in the above range has excellent moldability.

The thermoplastic elastomer of the present invention has a gel ratio of, preferably, 5% by weight or more and more preferably 15 to 94% by weight, the gel ratio being measured by the following method.

Method of Measuring the Gel Ratio

About 100 mg of pellets of a thermoplastic elastomer is weighed as a sample and wrapped in a 325 mesh screen. These wrapped pellets in the screen are soaked in 30 ml of p-xylene amounting which is an amount enough for the pellets in a closed container at 140° C. for 24 hours.

Next, this sample is taken out on a filter paper and dried at 80° C. for 2 hours or more until the amount of the sample becomes constant. The gel ratio is given by the following equation.

Gel ratio [% by weight]=[Dry weight of the sample after soaked in p-xylene/Weight of the sample before soaked in p-xylene]×100

Rubber Component (A1)

The rubber component (A1) used as a raw material of the rubber (A) which is partially or all crosslinked according to the present invention preferably has a glass transition temperature (Tg) of −30° C. or less. Also, the degree of crystallization of the rubber component (A1) used in the present invention is preferably less than 10%, the degree of crystallization being found by a DSC method.

Examples of the rubber component (A1) may include diene type rubbers such as a polybutadiene, poly(styrene-butadiene) and poly(acrylonitrile-butadiene), saturated rubbers obtained by hydrogenating these diene type rubbers, isoprene rubber, chloroprene rubber, acryl type rubbers such as a butyl polyacrylate, ethylene/propylene copolymer rubber, ethylene/propylene/diene monomer copolymer rubber and ethylene/octene copolymer rubber.

Among these rubber components (A1), ethylene/α-olefin (/nonconjugated polyene) copolymers are particularly preferable.

The ethylene/α-olefin (/nonconjugated polyene) copolymer rubber used in the present invention is copolymer rubbers of ethylene, α-olefin and, according to the need, a nonconjugated polyene. Examples of these copolymer rubbers include an ethylene/α-olefin/nonconjugated polyene copolymer rubber (a1) and ethylene/α-olefin copolymer rubber (a2).

The ethylene/α-olefin/nonconjugated polyene copolymer rubber (a1) used in the present invention is an olefin type copolymer rubber constituted of ethylene, α-olefin having 3 to 20 carbon atoms and a nonconjugated polyene.

Specific examples of the (α-olefin having 3 to 20 carbon atoms include propylene, 1-butene, 4-methylpentene-1, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyldecene-1, 11-methyldodecene-1 and 12-ethyltetradecene-1. Among these compounds, propylene, 1-butene, 4-methylpenetene-1, 1-hexene and 1-octene are preferable. Propylene is especially preferable.

These α-olefins are used either singly or in combinations of two or more.

Also, specific examples of the nonconjugated polyene include chain nonconjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, 8-methyl-4-ethylidene-1,7-nonadiene, 4-ethylidene-1,7-undecanediene; cyclic nonconjugated dienes such as methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene, 5-vinyl-2-norbornene, 5-isopropenyl-2-norbornene, 5-isobutenyl-2-norbornene, cyclopentadiene and norbornadiene; and trienes such as 2,3-diisopropylidene-5-norbornene, 2-ethylidene-3-isopropylidene-5-norbornene, 2-propenyl-2,2-norbornadiene and 4-ethylidene-8-methyl-1,7-nanodiene. Among these compounds, 5-ethylidene-2-norbornene, 5-vinyl-2-norbornene, cyclopentadiene and 4-ethylidene-8-methyl-1,7-nanodiene are preferable.

The ethylene/α-olefin/nonconjugated polyene copolymer rubber (a1) has the following composition: the content (ethylene content) of a structural unit derived from ethylene is 50 mol % or more, usually 50 to 90 mol % and preferably 60 to 85 mol %, the content (α-olefin content) of a structural unit derived from α-olefin having 3 to 20 carbon atoms is 50 mol % or less, usually 50 to 10 mol % and preferably 40 to 15 mol %, the content of a nonconjugated polyene is usually 0.1 to 30 and preferably 0.1 to 25 in terms of iodine value. In this case, the total content of ethylene and α-olefin is 100 mol %. The composition of the ethylene/α-olefin/nonconjugated polyene copolymer rubber (a1) is found by measurement using $^{13}$C-NMR.

The ethylene/α-olefin/nonconjugated polyene copolymer rubber (a1) used in the present invention may be an oil extended rubber which is compounded of a softener (D) and preferably a mineral oil type softener when it is produced. Examples of the mineral oil type softener include conventionally known mineral oil type softeners such as a paraffin type process oil.

Also, the Mooney viscosity [$ML_{1+4}$ (100° C.)] of the ethylene/α-olefin/nonconjugated polyene copolymer rubber (a1) is usually 10 to 250 and preferably 30 to 150.

The ethylene/α-olefin/nonconjugated polyene copolymer rubber (a1) as mentioned above may be produced by a conventionally known method.

As the copolymer rubber of ethylene with α-olefin and, according to the need, a nonconjugated polyene, an ethylene/α-olefin copolymer rubber (a2) obtained by copolymerizing ethylene with an α-olefin having 3 to 20, preferably 3 to 12 and more preferably 3 to 8 carbon atoms may be used.

Specific examples of such an ethylene/α-olefin copolymer (a2) may include an ethylene/propylene copolymer rubber (EPR), ethylene/1-butene copolymer rubber (EBR) and ethylene/1-octene copolymer rubber (EOR).

The melt flow rate (MFR: ASTM D 1238, 190° C., load: 2.16 kg) of the ethylene/(α-olefin copolymer (a2) is usually 0.1 to 100 g/10 min., preferably 0.2 to 50 g/10 min. and more preferably 0.5 to 30 g/10 min.

As the α-olefin constituting the ethylene/α-olefin copolymer rubber (a2), the same α-olefins as that constituting the ethylene/α-olefin/nonconjugated polyene copolymer rubber (a1) may be exemplified.

The ethylene/α-olefin copolymer rubber (a2) has the following composition: the content (ethylene content) of a structural unit derived from ethylene is 50 mol % or more, usually 50 to 90 mol % and preferably 60 to 85 mol % and the content (α-olefin content) of a structural unit derived from (α-olefin having 3 to 20 carbon atoms is 50 mol % or less, usually 50 to 10 mol % and preferably 40 to 15 mol %.

The copolymer rubber of ethylene with α-olefin and, according to the need, nonconjugated polyene may be made only of one or more of the ethylene/α-olefin/nonconjugated polyene copolymer rubber (a1) or only of one or more of the ethylene/α-olefin copolymer rubber (a2) or may be made of a combination of (a1) and (a2). In this case, the ratio of (a1) to (a2) to be used is 50 parts by weight or less and usually 10 to 50 parts by weight based on 100 parts by weight of the total amount of the ethylene/α-olefin/nonconjugated rubber (a1) and the ethylene/α-olefin copolymer rubber (a2).

Isotactic Polypropylene (B)

As the isotactic polypropylene (B) of the present invention, one having a isotactic pentad ratio of 0.8 or more and preferably 0.85 or more is preferable, wherein the isotactic pentad ratio is measured by $^{13}C$-NMR. The isotactic polypropylene (B) is a propylene homopolymer or a propylene copolymer obtained by random- or block-polymerizing propylene with ethylene and/or an (α-olefin having 4 to 20 carbon atoms.

Specific examples of the α-olefin having 4 to 20 carbon atoms include 1-butene, 4-methylpentene-1, 1-hexene, 1-heptene, 1-octene, 1-nonene, 1-decene, 1-undecene, 1-dodecene, 1-tridecene, 1-tetradecene, 1-pentadecen, 1-hexadecene, 1-heptadecene, 1-nonadecene, 1-eicosene, 9-methyldecene-1, 11-methyldodecene-1 and 12-ethyltetradecene-1.

As a comonomer to be copolymerized with propylene, ethylene and 1-butene are preferable. These α-olefins may be either singly or in combinations of two or more.

In this propylene copolymer, the content (propylene content) of the structural unit derived from propylene is usually 50 to 90% by weight and preferably 55 to 85% by weight and the content (comonomer content) of the structural unit derived from the comonomer is usually 50 to 10% by weight and preferably 45 to 15% by weight. The composition of a propylene copolymer is found by measuring using $^{13}C$-NMR.

The isotactic polypropylene (B) used in the present invention may be produced by a known polymerization method. Or, it is possible to get and use a commercially available one.

The melt flow rate (MFR; ASTM D1238, 230° C., load: 2.16 kg) of the isotactic polypropylene (B) is usually 0.01 to 100 g/10 min., preferably 0.1 to 80 g/10 min. and more preferably 0.3 to 60 g/10 min.

Syndiotatic Polypropylene (C)

As the syndiotatic polypropylene (C) of the present invention, a highly stereo specific one having a syndiotactic pentad ratio of 0.60 or more and preferably 0.65 or more may be utilized, wherein the syndiotactic pentad ratio is measured by $^{13}C$-NMR.

Also, as the syndiotactic polypropylene (C), not only a propylene homopolymer having a syndiotactic polypropylene structure but also a copolymer of propylene and ethylene or an α-olefin having 4 or more carbon atoms may be utilized. A copolymer in which the content of ethylene or an α-olefin having 4 or more carbon atoms as the other olefins is 6% by weight or less is preferably used.

Examples of the catalyst used to produce the homopolymer or copolymer having a syndiotactic polypropylene structure may include, besides the compounds described in the aforementioned references, catalysts comprising a crosslinking type transition metal compound and a cocatalyst which have ligands asymmetric to each other as described in each publication of JP-A Nos. 2-41303, 2-41305, 3-179005, 3-179006and 4-69394. Even catalysts having different structures may be utilized in so far as they can produce a polypropylene of which the syndiotactic pentad ratio measured by $^{13}C$-NMR is 0.6 or more.

The proportion of the cocatalyst (preferably aluminoxane) to be used is usually 10 to 1000000 molar equivalents and preferably 50 to 5000 molar equivalents to the transition metal catalyst. Also, no particular limitation is imposed on the polymerization condition and a solvent polymerization method using an inert solvent, or a bulk polymerization method or vapor-phase polymerization method in which an inert solvent is not substantially present may also be utilized. The polymerization is carried out in the following condition: polymerization temperature: −100 to 200° C. and polymerization pressure: normal pressure to 100 kg/cm²-G. It is preferable that the polymerization temperature be 0 to 100° C. and the polymerization pressure be normal pressure to 50 kg/cm²-G.

As the molecular weight of these syndiotactic polypropylene (C), the utilization of a syndiotactic polypropylene of which the melt flow index (melt flow rate) measured at 230° C. under a load of 2.16 kg according to ASTM-D1238 is 0.01 to 100 g/10 min. and preferably 0.05 to 50 g/10 min. and which has a relatively high molecular weight is preferable in the point of the qualities of an extrusion-molded article.

The syndiotactic polypropylene (C) used in the present invention may be, as required, compounded of known additives such as a anti-blocking agent, lubricant, crystal nucleus agent, ultraviolet absorber, heat stabilizer, weatherability stabilizer, anti-radiation agent, pigments and dyes.

Softener (D)

The softener is used as a regulator for controlling processability and hardness and is explained in, for example, Rubber Industry Handbook (edited by Japan Rubber Society, (1973)).

Specifically, the following compounds are used as the softener:

Petroleum type softeners such as process oil, lubricating oil, paraffin, liquid paraffin, polyethylene wax, polypropylene wax, petroleum asphalt and vaseline;

coal tar type softeners such as coal tar and coal tar pitch;

fatty oil type softeners such as caster oil, linseed oil, rapeseed oil, soybean oil and coconut oil;

tole oil;

rubber substitute (factice);

waxes such as bees wax, carnauba wax and lanolin;

fatty acids or fatty acid salts such as ricinoleic acid, palmitic acid, stearic acid, barium stearate, calcium stearate and zinc laurate;

naphthenic acid;

pine oil, rosin or its derivatives;

synthetic polymer materials such as a terpene resin, petroleum resin, cumarone indene resin and a tactic polypropylene;

ester type softeners such as dioctyl phthalate, dioctyl adipate and dioctyl sebacate;

microcrystalline wax, liquid polybutadiene, modified liquid polybutadiene, liquid polyisoprene, terminal modified polyisoprene, hydrogenated terminal modified polyisoprene, liquid thiokol and hydrocarbon type synthetic lubricant. Among these compounds, petroleum type softeners are preferably used and particularly process oil is preferably used.

The softener (D) may be added together with other raw materials or the raw material gum to be used may be oil-extended using the softener (D) in advance in the production of the thermoplastic elastomer.

Crosslinking Agent (E)

Examples of the crosslinking agent (E) used in the present invention include organic peroxides, sulfur, sulfur compounds and phenol type vulcanizing agents such as a phenol-resin. Among these compounds, organic peroxides are preferably used.

Examples of the organic peroxides include dicumyl peroxide, di-tert-butyl peroxide, 2,5-dimethyl-2,5-di-(tert-butylperoxy)hexane, 2,5-dimethyl-2,5-di(tert-butylperoxy)hexine-3,1,3-bis(tert-butylperoxyisopropyl)benzene, 1,1-bis(tert-butylperoxy)-3,3,5-trimethylcyclohexane, n-butyl-4,4-bis(tert-butylperoxy) valerate, benzoyl peroxide, p-chlorobenzoyl peroxide, 2,4-dichlorobenzoyl peroxide, tert-butyl peroxybenzoate, tert-butyl perbenzoate, tert-butylperoxyisopropyl carbonate, diacetyl peroxide, lauroyl peroxide and tert-butylcumyl peroxide.

Among these compounds, 2,5-dimethyl-2,5-di-(tert-butylperoxy)hexane, 2,5-dimethyl-2,5-di(tert-butylperoxy) hexine-3,1,3-bis(tert-butylperoxyisopropyl)benzene, 1,1-bis(tert-butylperoxy)-3,3,5-trimethylcyclohexane and n-butyl-4,4-bis(tert-butylperoxy) valerate are preferable and 1,3-bis(tert-butylperoxyisopropyl)benzene are most preferable from the viewpoint of odors and scorching characteristics.

This organic peroxide is used in a ratio of usually 0.01 to 1.0 part by weight, preferably about 0.03 to 0.9 parts by weight to the total amount (100 parts by weight) of the rubber component (A1), isotactic polypropylene (B), syndiotactic polypropylene (C) and softener (D). When the organic peroxide is used in the above ratio, a thermoplastic elastomer having satisfactory rubber characteristics as to heat resistance, tensile characteristics, elasticity recovery characteristics and impact resilience and sufficient strength is obtained. This thermoplastic elastomer has excellent moldability.

When the crosslinking treatment using the above organic peroxide is carried out in the present invention, crosslinking adjuvants such as sulfur, p-quinonedioxime, p,p'-dibenzoylquinonedioxime, N-methyl-N,4-dinitrosoaniline, nitrobenzene, diphenylguanidine and tromethylolpropane-N, N'-m-phenylenedimaleimide, polyfunctional methacrylate monomers such as divinylbenzene, triallyl cyanurate, ethylene glycol dimethacrylate, diethylene glycol dimethacrylate, polyethylene glycol dimethacrylate, trimethylolpropane trimethacrylate and allylmethacrylate and polyfunctional vinyl monomers such as vinylbutyrate and vinyl stearate may be compounded. A uniform and mild crosslinking reaction is expected by such a compound. Particularly, the use of divinylbenzene is most preferable because it is handled with ease, it has high compatibility with the rubber component (A1), isotactic polypropylene (B) and syndiotactic polypropylene (C) which are major components of the aforementioned materials to be treated, has the ability to solubilize an organic peroxide and works as a dispersion adjuvant for the organic peroxide and therefore a thermoplastic having a good balance between fluidity and physicality is obtained.

In the present invention, the amount of the crosslinking adjuvant or polyfunctional vinyl monomer to be compounded is preferably 0.01 to 1.0% by weight and particularly preferably 0.03 to 0.9% by weight based on the total amount (100% by weight) of the rubber component (A1), isotactic polypropylene (B), syndiotactic polypropylene (C) and softener (D). A thermoelastic elastomer is obtained which has high fluidity and is reduced in physical change caused by heat history when processing molding is carried out by compounding the crosslinking adjuvant or a polyfunctional vinyl monomer in the amount falling in the above range.

Other Components

The thermoplastic elastomer according to the present invention may be compounded of additives such as a slipping agent, filler, antioxidant, weatherability stabilizer and colorants to the extent that the object of the present invention is not disturbed.

Examples of the above slipping agent include fatty acid amide, silicone oil, glycerin, wax and paraffin type oil. These components may be added after the softener is dynamically heat-treated as a fluidity or hardness regulator.

Examples of the filler include conventionally known fillers, specifically, carbon black, clay, talc, calcium carbonate, kaolin, diatomaceous earth, silica, alumina, graphite and glass fiber.

Molded Article

Although the thermoplastic elastomer molded article according to the present invention can be obtained by a known molding method, it is preferably produced by extrusion molding in particular. In the extrusion molding, a conventionally known extruder such as a single-axis extruder or two-axis extruder and a conventionally known molding condition may be adopted.

Examples of the molded articles include materials which are used in the following applications and for which softness, mechanical strength, shape recoverability, impact resilience and high-temperature mechanical properties are required. These applications include automobile parts such as a glass run channel, weather strip sponge, body panel, steering wheel and side shield, industrial mechanical parts, electric/electronic parts such as a cable coating rubber, connector and cap plug, civil/construction parts such as a water supply plate and noise control wall, medical parts, footwear such as a sole and sandal, golf club grip, baseball bat grip, swimming fin, leisure articles such as a hydroscope, and miscellaneous articles such as a gasket, waterproof cloth, garden hose and belt.

The thermoplastic elastomer according to the present invention is superior in rubber elasticity and extrusion moldability and is therefore molded into target articles with ease.

PREFERRED EMBODIMENTS OF THE INVENTION

The present invention will be explained in more detail by way of examples. These examples should not be construed as limiting the scope of the invention.

The melting point (Tm) of the crystalline polypropylene used in the following examples and comparative examples, the melt flowrate (MFR) of the thermoplasticelastomer (TPE) obtained in the following examples and comparative examples and the hardness, tensile strength, elongation, compression set (CS) and extrusion moldability of the molded article obtained in each of the following examples and comparative examples were measured and evaluated according to the following methods.

(1) Melt Flow Rate (MFR)

The melt flow rate of the thermoplastic elastomer composition was measured at 230° C. under a load of 10 kg according to ASTM D1238.

(2) Hardness

The hardness was found by measuring Shore A harness according to JIS K6253. In the measurement, a sheet was manufactured by a press molding machine and an A-type measuring meter was used to read the division immediately after a press needle was in contact with the sheet.

(3) Tensile Strength and Elongation

A tensile test was made in the following condition according to JIS K6251 to measure tensile strength and elongation when the test piece was ruptured.

A sheet was manufactured by a press molding machine to form a JIS No. 3 test piece by punching and a test was made in the condition of a tensile speed of 500 mm/min.

(4) Compression Set CS

A cylindrical molded article having a diameter of 29.0 mm and a thickness of 12.7 mm was produced using a vertical injection molding machine. The molded article was compressed by 25% by a spacer, heat-treated at 70° C. for 24 hours and allowed to stand in a 23° C. thermostat for 30 minutes after treated, to measure the thickness of the molded article according to JIS K6262.

(5) Die-Residue

A belt-like dice was set to a 50 mmφ Extruder manufactured by Tanabe Plastic Kikai (K.K.) and the thermoplastic elastomer was extrusion-molded in the following temperature condition: C1/C2/C3/C4/C5/H/D=160/170/180/190/190/190/190, to measure the amount of die-residue stuck to the dice per unit extrusion amount.

(6) Adherence to a Guide Roll

When the composition was extrusion-molded by the extruder in the above (5), a belt-like molded body was extruded in a water tank and transferred continuously along a guide roll in the water tank. The case where the molded article is not seen to adhere to the guide roll in the water tank is defined as "○" and the case where any adhesion is seen is defined as "x".

REFERENCE EXAMPLE

The atmosphere in an autoclave having an internal volume of 200 l was substituted with propylene. Then, 0.2 g of isopropyl (cyclopentadienyl-1-fluorenyl)zirconium dichloride obtained by adding lithium to isopropylpentadienyl-1-fluorene synthesized according to a usual method and reacting the resulting product with zirconium tetrachloride, followed by recrystallizing, and 30 g of methylaluminoxane (manufactured by Tosoh Akzo Corporation) (degree of polymerization: 16.1) were charged in the autoclave and then 40 kg of liquid propylene was charged in the autoclave. Then, the mixture was heated to 60° C. to run polymerization for one hour. 1 kg of methanol was added to delime and then the unreacted propylene was purged. Then the polymer mixture was subjected to filtration to obtain 20.0 kg of a syndiotactic polypropylene. This polypropylene was subjected to measurement using $^{13}$C-NMR to find that it had a syndiotactic pentad ratio of 0.793 and a melt flow index (hereinafter designated as MI, measured at 230° C. and at 2.16 kgf) of 8.2 g/10 min. and that the ratio (hereinafter referred to as Mw/Mn) of the weight average molecular weight to number average molecular weight which were measured using 1,2,4 trichlorobenzene was 2.4. 100 parts by weight of this syndiotactic polypropylene was compounded of an antioxidant (trade name: Irgaphos 168, manufactured by Nippon Ciba-Geigy Corp., 0.1 parts by weight and trade name: Irganox 1010, manufactured by Nippon Ciba-Geigy Corp., 0.05 parts by weight) and 0.1 parts by weight of ethylenebisstearylamide to produce pellets (hereinafter abbreviated as SPP) at 200° C. by using a 50 mmφ single-axis extruder. The MFR of SPP was 10.2 g/10 min. (230° C., 2.16 kgf)

Example 1

66 parts by weight of an oil extended ethylene/propylene/5-ethylidene-2-norbornene copolymer rubber (ethylene content: 78 mol %, propylene content: 22 mol %, iodine value: 13, Mooney viscosity [$ML_{1+4}$ (100° C.)]: 74, amount of oil to be extended: 62 parts by weight of a paraffinic process oil (trade name: PW-380, manufactured by Idemitsu Kosan (K.K.), hereinafter referred to as EPT) and 10 parts by weight of an ethylene/propylene copolymer (ethylene content: 40 mol %, propylene content 60 mol %, MFR =0.5 g/10 min. (230° C., 2.16 kgf) as rubber components, 7.5 parts by weight of an isotactic homopolypropylene (MFR=0.5 g/10 min. (230° C., 2.16 kgf), hereinafter abbreviated as PP-1) and 14 parts by weight of an isotactic homopolypropylene (MFR=1.5 g/10 min. (230° C., 2.16 kgf), hereinafter abbreviated as PP-2) as isotactic polypropylene components, 2.5 parts by weight of SPP, 2.5 parts by weight of carbon black master batch (carbon black: 40% by weight, low-density polyethylene: 60% by weight), 0.1 parts by weight of a phenol type antioxidant (trade name: Irganox 1010, manufactured by Nippon Ciba-Geigy Corp.) as an antioxidant, 0.1 parts by weight of a diazo type weatherability stabilizer (trade name: Tinubin 326, manufactured by Nippon Ciba-Geigy Corp.) and 0.05 parts by weight of a HALS type weatherability stabilizer (trade name: Sanol LS-770) as weatherability stabilizers, 0.3 parts by weight of a fatty acid amide type lubricant (trade name: Armoslip CP, manufactured by Lion Corporation) as a lubricant, 0.28 parts by weight of an organic peroxide (trade name: Perhexa 25B, manufactured by Nippon Oil & Fats Co., Ltd.) as a crosslinking agent and 0.21 parts by weight of divinylbenzene (DVB) as a crosslinking adjuvant were thoroughly mixed by a Henshel mixer. The mixture was granulated using an extruder (tradename: TEM-50, manufactured by Toshiba Machine Co., Ltd., L/D=40, cylinder temperature: C1 to C2: 120° C., C3 to C4: 140° C., C5 to C6: 180° C., C7 to C8: 200° C., C9 to C12: 220° C., dice temperature: 210° C., rotations of a screw: 200 rpm, amount to be extruded: 40 kg/h) with injecting 20 parts by weight of a paraffinic process oil (trade name: PW-380, manufactured by Idemitsu Kosan (K.K.) into the cylinder to obtain thermoplastic elastomer pellets.

A molded article obtained from the pellet-form thermoplastic elastomer and the extrusion moldability of the elastomer were evaluated according to the aforementioned method. The results are shown in Table 1.

Example 2

The same procedures as in Example 1 were conducted except that the amount of SPP was altered to 5 parts by weight and the amount of PP-1 was altered to 5 parts by weight. The results are shown in Table 1.

Comparative Example 1

The same procedures as in Example 1 were conducted except that SPP was not added and the amount of PP-1 was altered to 10 parts by weight. The results are shown in Table 1.

Comparative Example 2

The same procedures as in Example 1 were conducted except that the amount of SPP was altered to 20 parts by weight, the amount of PP-1 was altered to 4 parts by weight and PP-2 was not added. The results are shown in Table 1.

10% by weight based on 100% by weight of the total amount of the crosslinked rubber (A), isotactic polypropylene (B), syndiotactic polypropylene (C) and softener (D), wherein the ratio ((C)/(B)) by weight of the syndiotactic polypropylene (C) to the isotactic polypropylene (B) is greater than 0 and less than 1, and the thermoplastic elastomer has a melt flow rate of 0.01 to 1000 g/10 min., wherein the melt flow rate is measured at 230° C. under a load of 10 kg according to ASTM D1238.

2. A thermoplastic elastomer according to claim 1, wherein the amount of the rubber (A) which is partially or all crosslinked is 5 to 94% by weight, the amount of isotactic polypropylene (B) is 4.5 to 85% by weight, the amount of syndiotactic polypropylene (C) is 0.5 to 10% by weight and the amount of the softener (D) is 1.0 to 60% by weight provided that the total amount of (A), (B), (C) and (D) is 100% by weight.

3. A thermoplastic elastomer according to claim 1, the elastomer being obtained by dynamically heat-treating a mixture containing a rubber component (A1), the isotactic polypropylene (B), the syndiotactic polypropylene (C) and the softener (D) in the presence of a crosslinking agent (E).

4. A thermoplastic elastomer according to claim 1, the elastomer being obtained by dynamically heat-treating a mixture containing a rubber component (A1), a polypropylene and the softener (D) in the presence of a crosslinking agent, and then by further adding a polypropylene to the reaction mixture, which is then melt-kneaded, where the propylene represents the isotactic polypropylene (B) and/or the syndiotactic polypropylene (C).

5. A thermoplastic elastomer according to claim 3 or 4, wherein the rubber component (A1) is an ethylene/α-olefin/nonconjugated polyene copolymer rubber (a1) having a

TABLE 1

| | Outline | | Example 1 | Example 2 | Comparative Example 1 | Comparative Example 2 |
|---|---|---|---|---|---|---|
| Raw material | Rubber component | % by weight | 42.3 | 42.3 | 42.3 | 42.3 |
| | Isotactic PP | % by weight | 17.9 | 15.8 | 20.0 | 3.3 |
| | Syndiotactic PP | % by weight | 2.1 | 4.2 | | 16.7 |
| | Paraffinic process oil | % by weight | 37.7 | 37.7 | 37.7 | 37.7 |
| Amount of carbon master batch to be added | | Parts by weight | 2.5 | 2.5 | 2.5 | 2.5 |
| Crosslinking agent | Peroxide | Parts by weight | 0.28 | 0.28 | 0.28 | 0.28 |
| Crosslinking adjuvant | Divinylbenzene | Parts by weight | 0.21 | 0.21 | 0.21 | 0.21 |
| Product properties | MFR | g/10 min | 39 | 37 | 40 | 21 |
| | Hardness | Shore A | 72 | 70 | 74 | 69 |
| | Tensile strength | Mpa | 4.6 | 4.4 | 4.4 | 4.0 |
| | Elongation | % | 450 | 480 | 390 | 500 |
| | Compression set | % | 45 | 44 | 45 | 46 |
| Extrusion characteristics | Die-residue | g- Die-residue/ton-material | 1.9 | 7.5 | 14.2 | 19 |
| | Adherence to a guide roll | — | None | None | None | Present |

INDUSTRIAL APPLICABILITY

The thermoplastic elastomer according to the present invention is superior in rubber elasticity and extrusion moldability and can be therefore molded into a target molded article.

What is claimed is:

1. A thermoplastic elastomer comprising a rubber (A) which is partially or all crosslinked, an isotactic polypropylene (B) having an isotactic pentad ratio of 0.8 or more, a syndiotactic polypropylene (C) having a syndiotactic pentad ratio of 0.6 or more and a softener (D), wherein the syndiotactic polypropylene (C) is contained in an amounts of 0.5 to Mooney viscosity ($ML_{1+4}$ (100° C.)) ranging from 10 to 250 and/or an ethylene/α-olefin copolymer rubber (a2) having a melt flow rate of 0.1 to 100 g/10 min., the melt flow rate being measured at 190° C. under a load of 2.16 kg according to ASTM D1238, the isotactic polypropylene (B) has a melt flow rate ranging from 0.01 to 100 g/10 min., the melt flow rate being measured at 230° C. under a load of 2.16 kg according to ASTM D1238 and the syndiotactic polypropylene (C) has a melt flow rate ranging from 0.01 to 100 g/10 min., the melt flow rate being measured at 230° C. under a load of 2.16 kg according to ASTM D1238.

6. A thermoplastic elastomer according to claim 3, wherein the crosslinking agent (E) is an organic peroxide.

7. A molded article produced by extrusion-molding the thermoplastic elastomer as claimed in claim 1.

8. A thermoplastic elastomer composition comprising a rubber (A) which is partially or all crosslinked, an isotactic polypropylene (B) having an isotactic pentad ratio of 0.8 or more, a syndiotactic polypropylene (C) having an syndiotactic pentad ratio of 0.6 or more, a softener (D), and a crosslinking agent (E), wherein the syndiotactic polypropylene (C) is contained in an amount of 0.5 to 10% by weight based on 100% by weight of the total amount of the elastomer composition and the ratio ((C)/(B)) by weight of the syndiotactic polypropylene (C) to the isotactic polypropylene (B) is greater than 0 and less than 1, the crosslinking agent (E) is present in an amount of 0.01 to 0.9% by weight based on 100% by weight of the total elastomer composition, the thermoplastic elastomer having a melt flow rate of 0.01 to 1000 g/10 min., wherein the melt flow rate is measured at 230° C. under a load of 10 kg according to ASTM D1238.

9. A thermoplastic elastomer composition according to claim 8, wherein the amount of the rubber (A) which is partially or all crosslinked is 5 to 94% by weight, the amount of isotactic polypropylene (B) is 4.5 to 85% by weight, the amount of syndiotactic polypropylene (C) is 0.5 to 10% by weight and the amount of the softener (D) is 1.0 to 60% by weight provided that the total amount of (A), (B), (C), (D), and (B) is 100% by weight.

10. A thermoplastic elastomer composition according to claim 8, the elastomer being obtained by dynamically heat-treating a mixture containing a rubber component (A1), the isotactic polypropylene (B), the syndiotactic polypropylene (C) and the softener (D) in the presence of a crosslinking agent (E).

11. A thermoplastic elastomer composition according to claim 8, the elastomer being obtained by dynamically heat-treating a mixture containing a rubber component (A1), a polypropylene and the softener (D) in the presence of a crosslinking agent (E), and then by further adding a polypropylene to the reaction mixture, which is then melt-kneaded, where the propylene represents the isotactic polypropylene (B) and/or the syndiotactic polypropylene (C).

12. A thermoplastic elastomer composition according to claim 10 or 11, wherein the rubber component (A1) is an ethylene/α-olefin/nonconjugated polyene copolymer rubber (a1) having a Mooney viscosity ($ML_{1+4}$ (100° C.)) ranging from 10 to 250 and/or an ethylene/α-olefin copolymer rubber (a2) having a melt flow rate of 0.1 to 100 g/10 min., the melt flow rate being measured at 190° C. under a load of 2.16 kg according to ASTM D1238, the isotactic polypropylene (B) has a melt flow rate ranging from 0.01 to 100 g/10 min., the melt flow rate being measured at 230° C. under a load of 2.16 kg according to ASTM D1238 and the syndiotactic polypropylene (C) has a melt flow rate ranging from 0.01 to 100 g/10 min., the melt flow rate being measured at 230° C. under a load of 2.16 kg according to ASTM D1238.

13. A thermoplastic elastomer composition according to claim 10, wherein the crosslinking agent (E) is an organic peroxide.

14. A molded article produced by extrusion-molding the thermoplastic elastomer composition as claimed in claim 8.

15. A thermoplastic elastomer composition according to claim 8, which additionally comprises a crosslinking adjuvant in an amount of 0.01 to 0.9% by weight based on 100% by weight of the total amount of the elastomer composition.

* * * * *